United States Patent
Lu et al.

(10) Patent No.: US 12,437,251 B2
(45) Date of Patent: Oct. 7, 2025

(54) SYSTEMS, APPARATUS, PROGRAM PRODUCTS, AND METHODS FOR INTELLIGENT MANAGEMENT OF ASSET WORKFLOWS

(71) Applicant: International Business Machines Corporation, Armonk, NY (US)

(72) Inventors: Fang Lu, Billerica, MA (US); Jeremy R. Fox, Georgetown, TX (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/686,913

(22) Filed: Mar. 4, 2022

(65) Prior Publication Data
US 2023/0281538 A1   Sep. 7, 2023

(51) Int. Cl.
*G06Q 10/0633*   (2023.01)
*G06Q 10/0635*   (2023.01)
*G02B 27/01*   (2006.01)
*G05B 9/00*   (2006.01)

(52) U.S. Cl.
CPC ..... *G06Q 10/0633* (2013.01); *G06Q 10/0635* (2013.01); *G02B 27/01* (2013.01); *G05B 9/00* (2013.01)

(58) Field of Classification Search
None
See application file for complete search history.

(56) References Cited

U.S. PATENT DOCUMENTS

| | | | |
|---|---|---|---|
| 10,824,310 B2 | 11/2020 | Acharya | |
| 2016/0171903 A1* | 6/2016 | Grossman | G06T 19/006 434/238 |
| 2017/0277171 A1 | 9/2017 | Asenjo et al. | |
| 2018/0089870 A1 | 3/2018 | Billi-Duran et al. | |

(Continued)

FOREIGN PATENT DOCUMENTS

| | | |
|---|---|---|
| EP | 2901413 B1 | 5/2019 |
| FR | 2699490 A1 | 6/1994 |

(Continued)

OTHER PUBLICATIONS

Yang, "Automated PPE-Tool pair check system for construction safety using smart IoT," 2020, Journal of Building Engineering, vol. 32, p. 101721 (Year: 2020).*

(Continued)

*Primary Examiner* — Ivan R Goldberg
(74) *Attorney, Agent, or Firm* — Tihon Poltavets

(57) ABSTRACT

Methods for intelligent management of asset workflows are disclosed herein. One method includes predicting that a user is going to perform a predetermined action based on one or more user movements included in a signal received from a wearable sensing device and generating, by a processor, a warning of one or more consequences of the user performing the predetermined action. The method further includes displaying, on augmented reality glass, the warning to the user prior to the user actually performing the predetermined action. Also disclosed herein are systems and apparatus that can include, perform, and/or implement the operations of the methods.

20 Claims, 10 Drawing Sheets

(56) References Cited

U.S. PATENT DOCUMENTS

| | | | |
|---|---|---|---|
| 2018/0131907 A1 | 5/2018 | Schmirler et al. | |
| 2020/0226836 A1 | 7/2020 | Ball et al. | |
| 2021/0210202 A1* | 7/2021 | Awiszus | G05B 19/0428 |
| 2021/0216773 A1* | 7/2021 | Bohannon | G06V 20/20 |
| 2021/0343182 A1* | 11/2021 | Lu | G09B 19/24 |
| 2021/0350312 A1* | 11/2021 | Swift | G06Q 10/06313 |
| 2021/0372561 A1* | 12/2021 | Swift | A41D 13/002 |
| 2022/0180260 A1* | 6/2022 | Watson | G06Q 10/0639 |

FOREIGN PATENT DOCUMENTS

| | | | |
|---|---|---|---|
| JP | 4401728 B2 | 1/2010 | |
| WO | WO-2022079540 A1 * | 4/2022 | G06Q 10/20 |

OTHER PUBLICATIONS

Liu, "Augmented Reality-assisted Intelligent Window for Cyber-Physical Machine Tools", Journal of Manufacturing Systems 44, Apr. 29, 2017, pp. 280-286, Elsevier Ltd., Auckland, New Zealand.

Ross, "Augmented Reality Interface for Visualizing and Interacting with IoT Devices", Prior Art Database Technical Disclosure, Sep. 11, 2018, pp. 1-22, IP.com.

Website: Enterprise asset management with IBM Maximo Application Suite, https://www.ibm.com/products/maximo/asset-management <Retrieved from the internet on Jun. 25, 2024>.

* cited by examiner

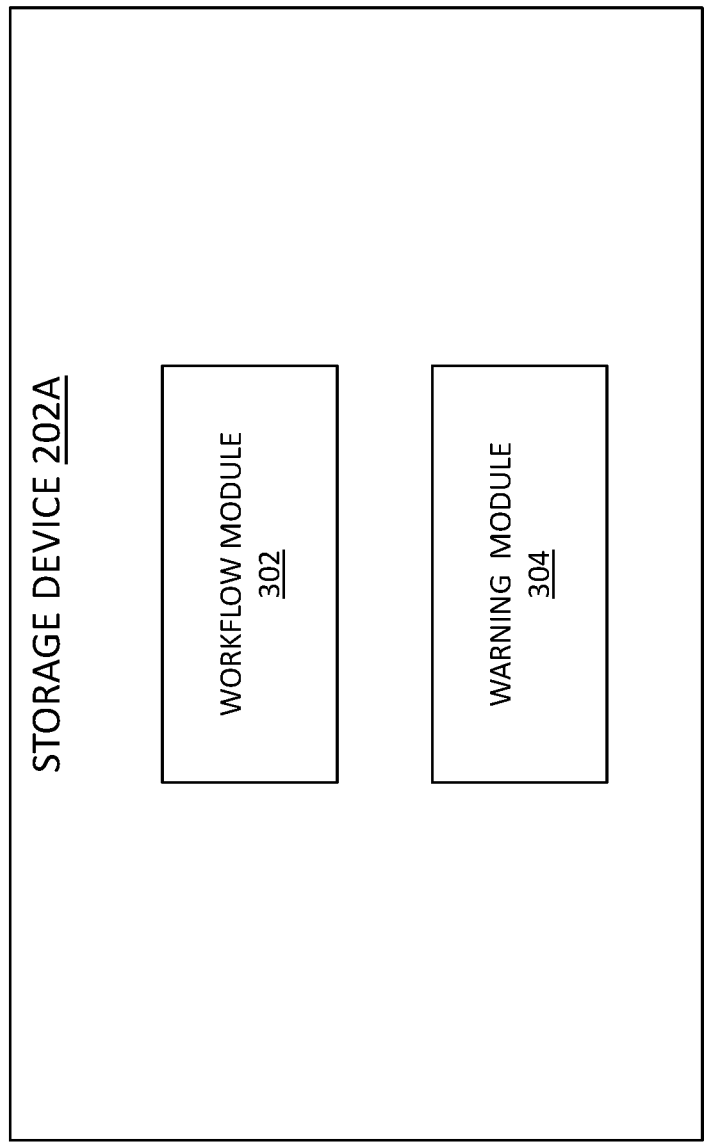

SYSTEMS, APPARATUS, PROGRAM PRODUCTS, AND METHODS FOR INTELLIGENT MANAGEMENT OF ASSET WORKFLOWS

FIELD

The subject matter disclosed herein relates to asset workflows and, more particularly, relates to systems, apparatus, program products, and methods for intelligent management of asset workflows.

BACKGROUND

Many contemporary device ecosystems (e.g., an industrial floor, a smart home, etc.) include multiple smart devices (e.g., robot(s), conveyor(s), cutting machine(s), wearable(s), mobile device(s), and/or Internet of Things device(s) (IoT(s)), etc.). In at least some contemporary device ecosystems, each device can include an IoT device generating IoT signals based on one or more events (e.g., started operations, stopped operations, increased/decreased payloads, health condition(s) of one or more machines, etc.). The IoT devices typically communicate with each other and make intelligent decisions based on the events from the one or more machines in the environment, which creates a workflow sequence.

In different contextual situations, one or more machines, devices, and/or sensors can be installed or removed from a device ecosystem, which typically results in a change in the automated workflow amongst the remaining devices. In other contextual situations, a user in the environment of the device ecosystem can influence one or more conditions (e.g., safety, security, etc.) of the environment, which can also affect the workflow of the device ecosystem. Contemporary device ecosystems do not integrate multiple contextual situations, which can result in an inefficient device ecosystem.

BRIEF SUMMARY

Systems, apparatus, and methods that can provide intelligent management of asset workflows are disclosed herein. One system includes a wearable piece of equipment including a first wearable computing device and a second wearable computing device. The first wearable computing device is configured to detect one or more user movements. The second wearable computing device is configured to predict that a user of the wearable piece of equipment is going to perform a predetermined action based on the detected one or more user movements and warn the user of one or more consequences of performing the predetermined action prior to the user actually performing the predetermined action.

An apparatus that can provide intelligent management of asset workflows includes a processor and a memory configured to store executable instructions. The executable instructions, when executed by the processor, cause the processor to implement a workflow module that predicts that a user is going to perform a predetermined action based on one or more user movements included in a signal received from a wearable sensing device. The executable instructions, when further executed by the processor, cause the processor to implement a warning module that generates a warning of one or more consequences of the user performing the predetermined action and displays, on augmented reality glass, the warning to the user prior to the user actually performing the predetermined action.

One method that can provide intelligent management of asset workflows includes predicting that a user is going to perform a predetermined action based on one or more user movements included in a signal received from a wearable sensing device and generating, by a processor, a warning of one or more consequences of the user performing the predetermined action. The method further includes displaying, on augmented reality glass, the warning to the user prior to the user actually performing the predetermined action.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 3A is a block diagram of a storage device included in the administrator of FIG. 2, according to various embodiments;

DETAILED DESCRIPTION

Figure 1:
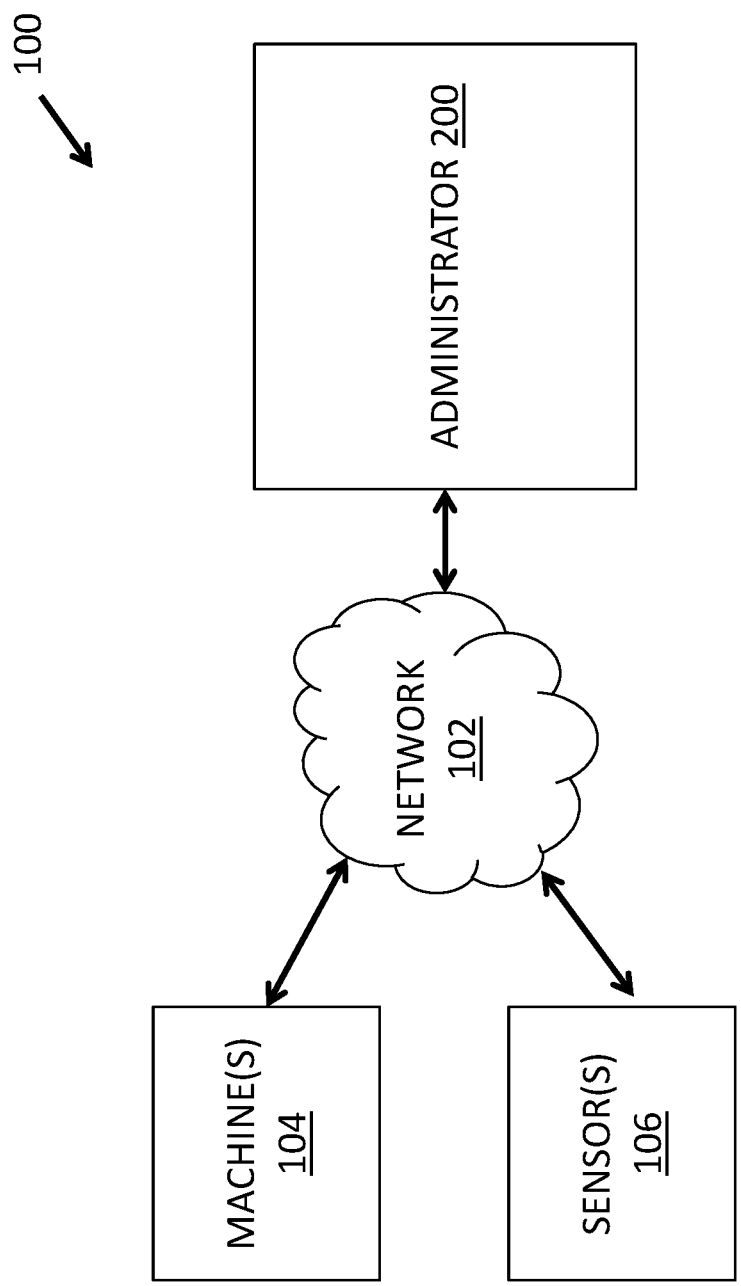
FIG. 1 is a block diagram of one embodiment of a system that can provide intelligent management of asset workflows.

Disclosed herein are various embodiments providing apparatus, systems, computer program products, and methods for booting a secondary operating system kernel with reclaimed primary kernel memory. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, apparatus, a computer program product, and/or a method. The computer program product may include a computer-readable storage medium (or media) including non-transitory computer-readable program instructions thereon for causing a processor to carry out aspects of the present technology.

The computer-readable storage medium may be a tangible device that can retain and store instructions for use by an instruction execution device. The computer-readable storage medium may be, but is not limited to, for example, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing system 100 (or computing network) for providing intelligent management of asset workflows. At least in the illustrated embodiment, the computing system 100 includes a network 102 connecting a set of one or more machines 104 (or device(s)), a set of one or more sensors 106, and an administrator 200.

The network 102 may include any suitable wired and/or wireless network 102 (e.g., public and/or private computer networks in any number and/or configuration (e.g., the Internet, an intranet, a cloud network, etc.)) that is known or developed in the future that enables the set of machines 104, the set of sensors 106, and the administrator 200 to be coupled to and/or in communication with one another and/or to share resources. In various embodiments, the network 102 can include a cloud network (e.g. internet area network or IAN), a SAN (e.g., a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating and/or sharing resources that are possible and contemplated herein.

A machine 104 (and/or device 104) can include any suitable computing hardware and/or software, industrial machine and/or device, commercial machine and/or device, residential machine and/or device, and/or governmental machine and/or device, etc., that is known or developed in the future that is capable of accessing and/or communicating with the administrator 200 via the network 102. In various embodiments, one or more of the machines 104 are configured to receive commands from the administrator 200 to start operations, stop operations, pause operations, resume operations, increase/decrease operations, and/or increase/decrease operational speed, etc., among other controls that are possible and contemplated herein. Further, the machine(s) 104 are configured to respectively start operations, stop operations, pause operations, resume operations, increase/decrease operations, and/or increase/decrease operational speed, etc., in response to receiving the corresponding command(s) from the administrator 200.

A set of machines 104 may include any suitable quantity of machines 104 for a particular environment (e.g., a smart ecosystem). In some embodiments, the set of machines 104 includes a single (e.g., one) machine 104. In additional or alternative embodiments, the set of machines 104 includes two or more machines 104.

In some embodiments, the machine(s) 104 include one or more sensors (e.g., a tag, an RFID tag, etc.) so that each machine 104 is detectable in an environment. In additional embodiments, the sensor(s) can further identify the type of machine for a corresponding machine 104. In some embodiments, one or more machines 104 is configured to respond to a signal (e.g., a ping) so that the machine 104 can be detected and/or the machine type can be identified. In various embodiments, the set of machines 104 operate/function in conjunction with a set of sensors 106 in providing the intelligent management of asset workflows.

A sensor 106 may include any suitable sensing hardware and/or software, sensing device, sensing system, computing device, and/or computing system that is known or developed in the future capable of independently, automatically, and/or automatedly performing the functions and/or operations of a sensor 106, as disclosed herein. In some embodiments, one or more of the sensors 106 include an Internet of Things (IoT) device. In additional or alternative embodiments, one or more sensors 106 include a wearable sensor 106.

A wearable sensor 106 and/or IoT sensor can be any suitable wearable and/or IoT sensing hardware and/or software, sensing device, sensing system, computing device, and/or computing system that is known or developed in the future. In some embodiments, the wearable sensor 106 and/or IoT sensor 106 can be placed, worn, and/or located on any suitable part of a human body. For example, the wearable sensor 106 and/or IoT sensor 106 can be worn on the head, eye(s), ear(s), mouth, nose, neck, arm(s), wrist(s), hand(s), finger(s), leg(s), ankle(s), foot/feet, toe(s), waist, and/or torso of the user, among locations that are possible and contemplated herein.

In additional or alternative embodiments, a wearable sensor 106 and/or IoT sensor 106 can be placed, worn, and/or located on any suitable wearable article of clothing, wearable article of safety clothing, wearable accessory, wearable safety accessory, wearable equipment, and/or wearable safety equipment, etc., among other places/locations and/or wearable items that are possible and contemplated herein. In some embodiments, the wearable sensor(s) 106 and/or IoT sensor(s) 106 can be placed, worn, and/or located on a suit, a safety, suit, a hat, a helmet, a shield an ear piece, a nose piece, an eye piece, glasses, a mouth piece, a mask, a neckerchief, a necklace, a lanyard, a shirt/blouse, a jacket, a coat, a watch, a glove, a ring, a bracelet, a belt, a pair of shorts, a pair of pants, a dress, a skirt, an ankle bracelet, an anklet, a sock, a shoe, an undergarment, a cane, a staff, a card, a key, and/or a keycard, among other wearable items and/or accessories that are possible and contemplated herein.

In certain embodiments, the wearable sensor 106 and/or IoT sensor 106 can include and/or form at least a portion of a smart device/system. Example smart devices/systems can include, but are not limited to, smart watches, smart shoes, E-textiles, smart phones, smart trackers, smart rings, smart glasses, activity trackers, personal digital assistants, and/or mobile computing devices/systems, etc., among other wearable and/or IoT smart devices/systems that are possible and contemplated herein.

A set of sensors 106 may include any suitable quantity of sensors 106 for a particular environment. In some embodiments, the set of sensors 106 includes a single (e.g., one) sensor 106. In additional or alternative embodiments, the set of sensors 106 includes multiple sensors 106 (e.g., two or more sensors 106).

In certain embodiments in which a set of sensors 106 includes multiple sensors 106, at least two sensors 106 are the same type of sensor 106. In other embodiments in which a set of sensors 106 includes multiple sensors 106, at least two sensors 106 are different types of sensors 106. In still other embodiments in which a set of sensors 106 includes multiple sensors 106, at least two sensors 106 are the same type of sensors 106 and at least two sensors 106 are different types of sensors 106.

In various embodiments, a set of sensors 106 is configured to detect, track, and/or monitor the movements of a user (e.g., a set of one or more user movements). Further, the sensor(s) 106 are configured to transmit a set of one or more sensor signals to the administrator 200 in response to detecting, tracking, and/or monitoring the movements of the user.

In various embodiments, the sensor signal(s) represent and/or are indicative of the detected, tracked, and/or monitored user movements. In certain embodiments, the sensor(s) 106 transmit the user movement(s) in real-time as the user performs, and the sensor(s) 106 detect, the user movements.

A set of user movements can include any suitable movement(s) that a user can perform. In various embodiments, the user movements can include a set of one or more movements that a user performs in the task(s) and/or operation(s) of a particular and/or predetermined workflow process. The user movement(s) can be performed in conjunction with and/or independent of the machine(s) 104.

In some embodiments, the user movement(s) can represent and/or be indicative of a user removing and/or modifying a wearable article of clothing, wearable article of safety clothing, wearable accessory, wearable safety accessory, wearable equipment, and/or wearable safety equipment, etc. In additional or alternative embodiments, the user movement(s) can represent and/or be indicative of a user moving to a different (new) geographic location (e.g., relocation movement(s)).

An administrator 200 may include any suitable hardware and/or software capable of performing operations, functions, and/or algorithms for providing intelligent management of asset workflows, as discussed elsewhere herein. In various embodiments, an administrator 200 may include any suitable computing system and/or computing device that can store computer-readable data and/or computer-usable data. In some embodiments, the administrator 200 includes hardware and/or software configured to execute instructions in one or more modules and/or applications for including and/or providing intelligent management of asset workflows, as discussed elsewhere herein.

An administrator 200 can be implemented as and/or form at least a portion of any suitable computing system and/or computing device capable of receiving a set of sensor signals and providing notifications and/or instructions to a user in response to receiving the sensor signal(s). Examples of an administrator 200 can include, but are not limited to, a display, a monitor, a video screen, video goggles, smart glasses, smart phone, a tablet, a PDA, and a smart watch, etc., among other personal devices that can show/provide notifications and/or instructions to a user that are possible and contemplated herein. In certain embodiments, an administrator includes augmented reality (AR) glass and/or AR glasses/goggles, among other AR devices that are capable of showing/providing notifications and/or instructions to a user that are possible and contemplated herein.

Figure 2:
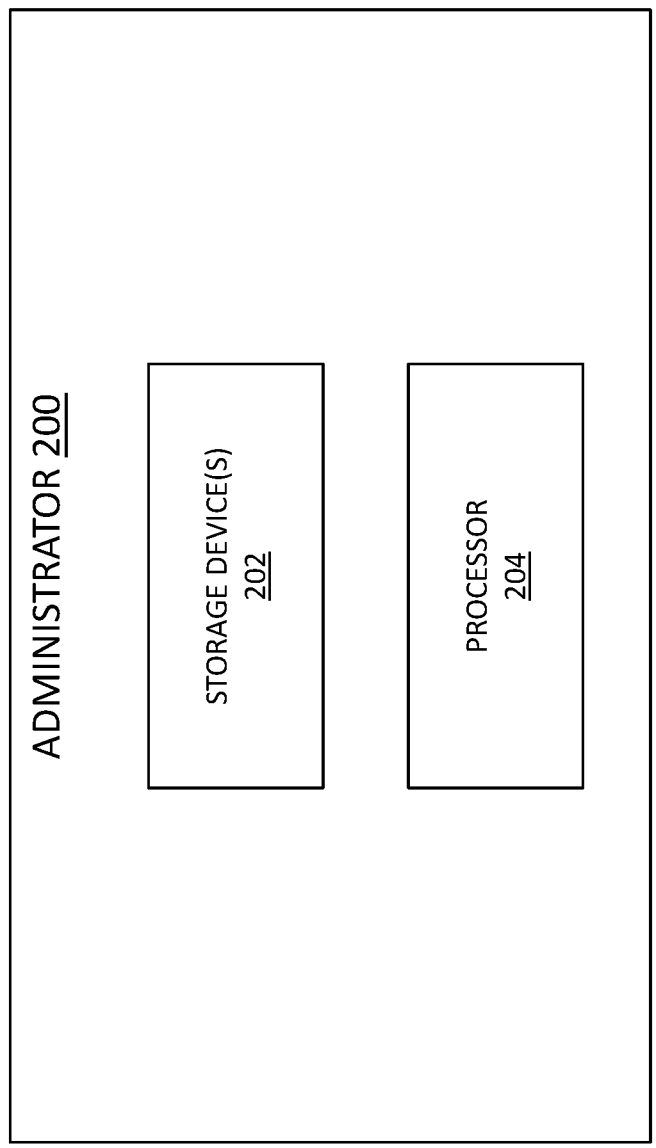
FIG. 2 is a block diagram of an administrator included in the system of FIG. 1, according to various embodiments.

Referring to FIG. 2, FIG. 2 is a block diagram of one embodiment of an administrator 200 for providing intelligent management of asset workflows. At least in the illustrated embodiment, the administrator 200 includes, among other components, a set of one or more storage devices 202 and processor 204.

A set of storage devices 202 may include any suitable quantity of storage devices 202 that can store data for a particular application, function, and/or use. Further, each storage device 202 may include any suitable size and/or storage capacity that is known or developed in the future.

In addition, a storage device 202 may include any type of memory device that is known or developed in the future that is capable of storing data. In various embodiments, a storage device 202 may include one or more non-transitory computer-usable mediums (e.g., readable, writable, etc.), which can include any non-transitory and/or persistent apparatus or device that can contain, store, communicate, propagate, and/or transport instructions, data, computer programs, software, code, routines, etc., for processing by or in connection with a computer processing device (e.g., the processor 204).

In various embodiments, the storage device(s) 202 can be implemented as flash memory (e.g., a solid-state device (SSD) or other non-volatile storage devices that store persistent data). Further, a storage device 202, in some embodiments, may include non-transitory memory such as, for example, a random-access memory (RAM) device, a dynamic random-access memory (DRAM) device, a static random-access memory (SRAM) device, and/or other types (e.g., non-volatile and/or persistent) of memory devices, etc., among other types of non-transitory memory that are possible and contemplated herein.

With reference to FIG. 3A, FIG. 3A is a block diagram of one embodiment of a storage device 202A. At least in the illustrated embodiment, the storage device 202A includes, among other components, a workflow module 302 and a warning module 304 coupled to and/or in communication with one another.

A workflow module 302 may include any suitable hardware and/or software that can receive sensor signals from a set of sensors (e.g., the sensor(s) 106). Further, the workflow module 302 can be configured to preemptively and/or proactively predict and/or determine that a user is going to perform one or more predetermined actions based on one or more detected/tracked/monitored user movements included in the sensor signal(s). In various embodiments, the workflow module 302 is configured to preemptively and/or proactively predict and/or determine that the user is going to perform the one or more predetermined actions prior to the user actually performing the predetermined action(s).

In some embodiments, in preemptively and/or proactively predicting and/or determining whether and/or if the user's movement(s) match and/or correspond to any one or more of the predetermined actions in the set of predetermined actions, the workflow module 302 is configured to compare and/or correlate the detected/tracked/monitored user's movements(s) and a set of one or more predetermined actions stored in the storage device(s) 202 and/or the processor 204. Here, a non-match and/or non-correlation indicates that the user is not going to and/or is not about to perform any of the predetermined actions in the set of predetermined actions. Alternatively, a match and/or correlation indicates that the user is going to and/or is not about to perform one or more of the predetermined actions in the set of predetermined actions.

In some embodiments, the one or more predetermined actions can include the workflow module 302 preemptively and/or proactively predicting and/or determining that a user is going to and/or is about to remove and/or modify one or more articles of clothing, articles of safety clothing, accessories, safety accessories, pieces of equipment, and/or pieces of safety equipment based on the detected/tracked/monitored user movement(s). In additional or alternative embodiments, the predetermined action(s) can include the workflow module 302 preemptively and/or proactively predicting and/or determining when and/or if a user is going to start/begin one or more tasks and/or operations in a workflow process, finish/complete the one or more tasks and/or operations in the workflow process, and/or finish/complete each task/operation in the workflow process. In further additional or alternative embodiments, workflow module 302 is configured to preemptively and/or proactively predict and/or determine that a user is going to and/or is about relocate to a different geographic location (e.g., move to and/or from a predetermined geographic location) based on the detected/tracked/monitored user movement(s).

The workflow module 302 can predict and/or determine that the user is going to and/or is about to perform the one or more predetermined actions prior to the user actually performing the predetermined action(s). In one non-limiting example, the workflow module 302 can predict and/or determine that the user is going to and/or is about to remove and/or modify one or more articles of clothing, one or more articles of safety clothing, one or more accessories, one or more safety accessories, one or more pieces of equipment, and/or one or more pieces of safety equipment in response to the workflow module 302 determining that the user movement(s) in the sensor signal(s) represent and/or are indicative of a user removing and/or modifying one or more articles of clothing, articles of safety clothing, accessories, safety accessories, pieces of equipment, and/or pieces of safety equipment. In other words, the user movements included in the sensor signal(s) match the predetermined actions for removing and/or modifying the article(s) of clothing, article(s) of safety clothing, accessory/accessories, safety accessory/accessories, piece(s) of equipment, and/or piece(s) of safety equipment.

In another non-limiting example, the workflow module 302 can predict and/or determine that the user is going to and/or is about to relocate to a different geographic location (e.g., move to and/or from a predetermined geographic location) in response to the workflow module 302 predicting and/or determining that the user movement(s) in the sensor signal(s) represent and/or indicate that a user is going to and/or is about to relocate to a different geographic location. In other words, the user movement(s) in the sensor signal(s) match the predetermined actions for relocating to a different geographic location. Again, the workflow module 302 can make the prediction and/or determination prior to the user actually relocating to the different geographic location.

In additional or alternative embodiments, the workflow module 302 can predict and/or determine that a user is starting and/or is about to start performing one or more functions and/or operations of a workflow process. In a non-limiting example, the workflow module 302 can predict and/or determine that the user has started and/or is going to and/or is about to start performing one or more tasks and/or operations that form at least a portion of a workflow process in response to one or more user movements included in the sensor signal(s) representing and/or indicating that the user is going to and/or is about to perform and/or start performing the task(s) and/or operation(s) that form at least the portion of the workflow process. In other words, the user movement(s) in the sensor signal(s) match the predetermined actions for performing and/or starting to perform the task(s) and/or operation(s) that form at least the portion of the workflow process. Here, the one or more tasks and/or operations forming at least a portion of the workflow process can be performed in conjunction with one or more machines 104, independent of the machine(s) 104, or in conjunction with one or more machines 104 and independent of one or more machines 104.

In further additional or alternative embodiments, the workflow module 302 can predict that and/or determine that the user has completed/finished and/or will finish/compete one or more predetermined actions. In a non-limiting example, the workflow module 302 can predict and/or determine that the user has finished and/or is going to complete performing one or more tasks and/or operations that form at least a portion of a workflow process in response to the workflow module 302 predicting and/or determining that one or more user movements included in the sensor signal(s) represent and/or indicate that the user has finished and/or is about to finish performing the task(s) and/or operation(s) that form at least the portion of the workflow process. In other words, the user movement(s) in the sensor signal(s) match the predetermined actions for completing and/or nearly completing performance of the task(s) and/or operation(s) that form at least the portion of the workflow process. Here, the one or more tasks and/or operations forming at least a portion of the workflow process can be performed in conjunction with one or more machines 104, independent of the machine(s) 104, or in conjunction with one or more machines 104 and independent of one or more machines 104.

In various embodiments, the workflow module 302 is configured to notify (e.g., transmit a notification signal) to the warning module 304 and or to an event visualization module 306 (see, FIG. 3B) in response to the user movement(s) included in the sensor signal(s) matching one or more predetermined actions in a set of predetermined actions for a user. In other words, the workflow module 302 is configured to notify and/or transmit a notification signal to the warning module 304 and/or to the event visualization module 306 in response to the workflow module 302 predicting and/or determining that the user is about perform a predetermined action, is performing a predetermined action, is about to complete a predetermined action, and/or has completed a predetermined action, examples of each of which are discussed elsewhere herein. Here, the notification and/or notification signal includes information and/or data representing and/or indicative of the prediction and/or determination that the user is about perform a predetermined action, is performing a predetermined action, is about to complete a predetermined action, and/or has completed a predetermined action, examples of each of which are discussed elsewhere herein.

A warning module 304 may include any suitable hardware and/or software that can receive notifications and/or notification signals from a workflow module 302. The warning module 304 may further include any suitable hardware and/or software that can, in response to receiving a notification and/or notification signal, generate and transmit a corresponding warning to a user.

In various embodiments, the warning module 304 is configured to generate and transmit a warning to the user in response to the notification and/or notification signal received from the workflow module 302 representing and/or indicating that the user is going to and/or is about to perform one or more predetermined actions. The generated warning corresponds to the predetermined action(s) and, in various embodiments, includes a warning and/or indication of one or more consequences that will result and/or may result from the user actually performing the predetermined action(s).

The one or more consequences may include any suitable consequence or set of two or more consequences related to one or more environments, one or more industrial applications, one or more residential applications, one or more military applications, one or more governmental applications, etc., among other environments and/or applications that are possible and contemplated herein. In some embodiments, the warning includes one or more consequences related to one or more machines 104.

The consequence(s) related to the machine(s) 104 may include any suitable consequence related to one or more particular machines 104. In various embodiments, the consequence(s) included in a warning can warn and/or notify a user that performing the predetermined action(s) will and/or can result in the user being hurt by a machine 104 or some other external device and/or force, the machine(s) 104 being turned OFF (e.g., until the predetermined action(s) are corrected and/or for a predetermined amount of time, etc.), the machine(s) 104 being paused (e.g., until the predetermined action(s) are corrected and/or for a predetermined amount of time, etc.), the machine(s) 104 being slowed down (e.g., until the predetermined action(s) are corrected and/or for a predetermined amount of time, etc.), and/or a supervisor being notified, etc., among other consequences that are possible and contemplated herein that are suitable for a particular environment and/or application.

In a non-limiting example, a warning may notify/warn the user that removing and/or modifying one or more articles of clothing, articles of safety clothing, accessories, safety accessories, pieces of equipment, and/or pieces of safety equipment will result in the user being more susceptible to injury, one or more machines 104 being turned OFF, one or more machines 104 being paused, one or more machines 104 being slowed down, and/or one or more of the user's supervisors being notified that the user has removed and/or modified the article(s) of clothing, article(s) of safety clothing, accessory/accessories, safety accessory/accessories, piece(s) of equipment, and/or piece(s) of safety equipment. In a similar non-limiting example, a warning may notify/warn the user that relocating to a particular and/or different geographic location will result in the user being more susceptible to injury, one or more machines 104 being turned OFF, one or more machines 104 being paused, one or more machines 104 being slowed down, and/or one or more of the user's supervisors being notified that the user has moved to a particular/different/new geographic location.

While the above examples discuss specific examples of consequence and/or predetermined user actions, the various embodiments disclosed herein are not limited to these specific examples. Rather, the above examples are presented so the one skilled in the art will better understand the various embodiments disclosed herein. As such, various other examples are possible and the various embodiments disclosed herein may include one or more other suitable consequences and/or one or more other suitable predetermined actions. That is, the spirit and scope of the various embodiments disclosed herein are not limited to the examples discussed herein. In other words, the spirit and scope of the various embodiments contemplate and include any and all suitable consequence(s) and/or predetermined action(s) that are possible. Accordingly, one skilled in the art will appreciate that the spirit and scope of the various embodiments may be applied to many different users, environments, machines 104, devices, and/or applications, etc.

The warning may be conveyed to the user in any suitable manner that uses one or more of a user's senses. In various embodiments, the warning is conveyed to the user using a visual and/or auditory warning. In some embodiments, the administrator 200 includes AR glass and the warning is shown visually on the AR glass and/or is an audible warning to the user (e.g., via a speaker).

Figure 3B:
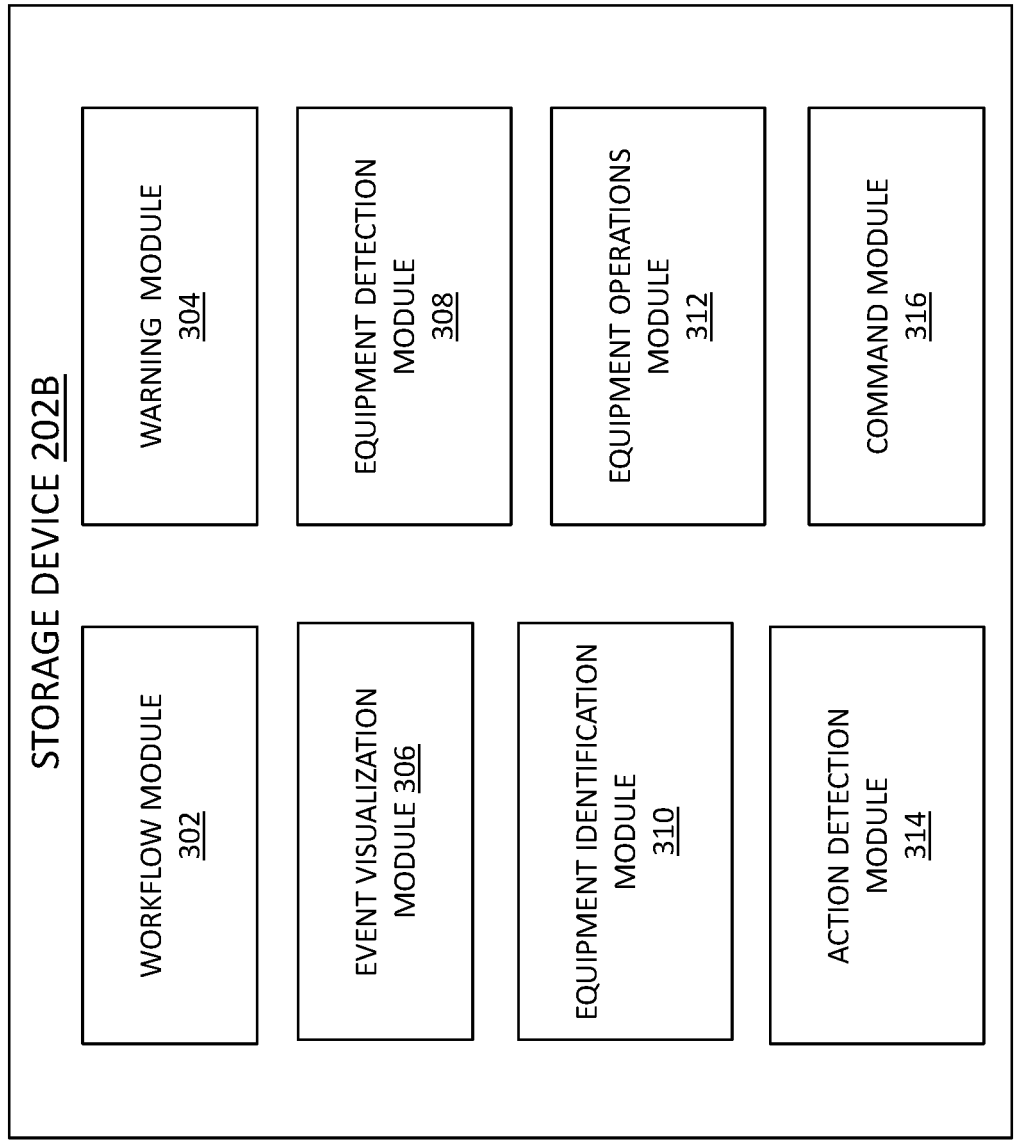
FIG. 3B is a block diagram of another storage device included in the administrator of FIG. 2, according to various embodiments.

FIG. 3B is a block diagram of another embodiment of a storage device 202B. The storage device 202B includes a workflow module 302 and a warning module 304 similar to the storage device 202A discussed above. At least in the illustrated embodiment, the storage device 202B further includes, among other components, an event visualization module 306, an equipment detection module 308, an equipment identification module 310, an equipment operations module 312, an action detection module 314, and a command module 316.

An event visualization module 306 may include any suitable hardware and/or software that can receive notifications and/or notification signals from a workflow module 302. The event visualization module 306 may further include any suitable hardware and/or software that can, in response to receiving a notification and/or notification signal, generate and transmit a corresponding information to a user.

The information generated by the event visualization module 306 and transmitted to the user may include any suitable information for a particular environment and/or application. In various embodiments, the event visualization module 306 is configured to generate and transmit information to the user in response to the notification and/or notification signal received from the workflow module 302 representing and/or indicating that the user is going to and/or is about to perform one or more operations and/or functions of a workflow process, is currently performing one or more operations and/or functions of the workflow process, is close to and/or about to complete/finish one or more operations and/or functions of the workflow process, has completed/finished one or more operations and/or functions of the workflow process, and/or has completed/finished all of the operations and/or functions of the workflow process.

The generated information, in various embodiments, can include a set of instructions for performing the current operation(s)/function(s) of the workflow process. In additional or alternative embodiments, the information can include a set of instructions for performing the next operation(s)/function(s) and/or one or more future operation(s)/function(s) of the workflow process. In further additional or alternative embodiments, the information can include a set of instructions for performing one or more new operations/functions and/or one or more modified operations/functions of the workflow process.

The new operation(s)/function(s) in the workflow process can be implemented because of updates to the workflow process, updates to one or more machines 104, and/or updates to and/or new regulations/procedures, etc., among other reasons for implementing one or more new operations/functions in a workflow process. Similarly, the modified operation(s)/function(s) in the workflow process can be implemented because of updates to the workflow process, updates to one or more machines 104, and/or updates to and/or new regulations/procedures, etc., among other reasons for implementing one or more modified operations/functions in a workflow process.

The information may be conveyed to the user in any suitable manner that uses one or more of a user's senses. In various embodiments, the information is conveyed to the user using visual and/or auditory cues. In some embodiments, the administrator 200 includes AR glass and the information is shown visually on the AR glass and/or is audible information (e.g., via a speaker).

An equipment detection module 308 may include any suitable hardware and/or software that can detect equipment in the environment within which the user and/or sensor(s) 106 current reside. In various embodiments, the equipment detection module 308 is configured to detect the machine(s) 104 in the environment within which the user and/or sensor(s) 106 current reside.

The equipment detection module 308 may detect the equipment (e.g., machine(s) 104) using any suitable technology, technique, and/or process that is known or developed in the future. In some embodiments, the equipment detection module 308 is configured to detect the machine(s) 104 (e.g., equipment) by pinging (e.g., transmitting a detection signal to) the equipment/machine(s) 104 and/or receiving one or more signals (e.g., a signal in response to the ping) from the one or more pieces of equipment and/or machine(s) 104 in the environment and/or a signal from one or more sensors on the machine(s) 104 (e.g., a signal from a tag, and/or a signal from an RFID tag, etc.), among other technologies, techniques, and/or processes that are possible and contemplated herein.

An equipment identification module 310 may include any suitable hardware and/or software that can identify and/or determine the type of equipment detected in the environment within which the user and/or sensor(s) 106 current reside. In various embodiments, the equipment identification module 310 is configured to detect the type of machine(s) 104 detected in the environment within which the user and/or sensor(s) 106 current reside. In certain embodiments, the equipment identification module 310 is configured to detect two or more different type of machine(s) 104 detected in the environment.

The equipment identification module 310 may identify the detected equipment (e.g., detected machine(s) 104) using any suitable technology, technique, and/or process that is known or developed in the future. In some embodiments, the equipment identification module 310 is configured to identify/determine the type of detected equipment (e.g., machine(s) 104) by retrieving an equipment identifier, a device identifier, and/or machine identifier included in one or more signals from the piece(s) of equipment and/or machine(s) 104 in the environment, among other technologies, techniques, and/or processes that are possible and contemplated herein.

An equipment operations module 312 may include any suitable hardware and/or software that can determine and/or store the operations for the detected and identified equipment in the environment within which the user and/or sensor(s) 106 current reside. In various embodiments, the equipment operations module 312 is configured to determine and/or store a list of the operations, one or more operating instructions, and/or functionality for the detected and identified machine(s) 104 in the environment within which the user and/or sensor(s) 106 current reside.

The list of the operations, one or more operating instructions, and/or functionality for the detected and identified equipment/machine(s) 104 in the environment may be conveyed to the user in any suitable manner that uses one or more of a user's senses. In various embodiments, the list of the operations, one or more operating instructions, and/or functionality for the detected and identified machine(s) 104 in the environment is conveyed to the user using visual and/or auditory cues. In some embodiments, the administrator 200 includes AR glass and the list of the operations, one or more operating instructions, and/or functionality for the detected and identified machine(s) 104 in the environment is shown visually on the AR glass and/or is audible information (e.g., via a speaker).

An action detection module 314 may include any suitable hardware and/or software that can receive one or more sensor signals from the sensor(s) 106. The action detection module 314 may further include any suitable hardware and/or software that can determine that a user has performed one or more of the predetermined actions.

In various embodiments, the action detection module 314 is configured to determine that the user has performed one or more of the predetermined actions based on the user movement(s) included in the sensor signal(s) received from the sensor(s) 106. In some embodiments, determining whether and/or if the user's movement(s) match and/or correspond to any one or more of the predetermined actions in the set of predetermined actions, the action detection module 314 is configured to compare and/or correlate the detected/tracked/monitored user's movements(s) and the set of one or more predetermined actions stored in the storage device(s) 202 and/or the processor 204. Here, a non-match and/or non-correlation indicates that the user has not performed any of the predetermined actions in the set of predetermined actions. The action detection module 314 is configured to facilitate the performance of the operation(s) of the workflow process in response to a non-match (e.g., the action detection module 314 determining that the user has not performed any of the predetermined actions).

Alternatively, a match and/or correlation indicates that the user has performed one or more of the predetermined actions in the set of predetermined actions. The action detection module 314, in certain embodiments, is configured to notify the command module 316 that the user has performed one or more of the predetermined actions in the set of predetermined actions in response to a match (e.g., the action detection module 314 determining that the user has performed one or more of the predetermined actions).

A command module 316 may include any suitable hardware and/or software that can receive one or more signals from the action detection module 314. The command module 316 may further include any suitable hardware and/or software that can generate and transmit a set of one or more commands to one or more machine(s) 104 (e.g., piece(s) of equipment) in response to receiving the signal(s) from the action detection module 314.

The set of commands can include any suitable command(s) that is/are known or developed in the future capable of modifying one or more of the operations/functions of the one or more machines 104 in the environment within which the user and/or sensor(s) 106 currently reside. That is, the set of commands can modify the operation(s)/function(s) of the machine(s) 104 in the environment in response to a determination that the user has performed one or more of the predetermined actions (e.g., the determination made by the action detection module 314).

In various embodiments, the operation(s)/function(s) of the one or more machines 106 modified by the command(s) from the command module 316 can correspond to the consequence(s) included in the warning(s) provided by the warning module 304 to the user. For example, the command(s) from the command module 316 can cause one or more machine(s) 104 to stop operations, pause operations, decrease operations, and/or decrease operational speed, as discussed elsewhere herein.

In certain embodiments, the command(s) from the command module 316 can cause a single (e.g., one) machine 104 to stop operations, pause operations, decrease operations, or decrease operational speed. In other embodiments, the command(s) from the command module 316 can cause multiple machines 104 to perform the same stop operations, pause operations, decrease operations, or decrease operational speed operations. In still other embodiments, the command(s) from the command module 316 can cause one or more machines 104 to perform the same stop operations, pause operations, decrease operations, or decrease operational speed operations and one or more machines 104 to perform different one of the stop operations, pause operations, decrease operations, or decrease operational speed operations.

The same stop operations, pause operations, decrease operations, or decrease operational speed operations may be performed by the same type of machines 106. Different stop operations, pause operations, decrease operations, or decrease operational speed operations may be performed by the same type of machines 106. Further, the one or more machines 104 that perform the same stop operations, pause operations, decrease operations, or decrease operational speed operations may be the same type or different types of machines 104 and/or the one or more machines 104 that perform the different ones of the stop operations, pause operations, decrease operations, or decrease operational speed operations may be the same type or different types of machines 104.

With reference again to FIG. 2, a processor 204 may include any suitable hardware and/or software capable of performing computer processes, functions, and/or algorithms. In various embodiments, the processor 204 includes hardware and/or software configured to execute instructions in one or more modules and/or applications for providing intelligent management of asset workflows, as discussed elsewhere herein.

The one or more modules and/or applications for providing intelligent management of asset workflows may be stored in the storage device(s) 202A and/or 202B (also simply referred to individually and/or collectively as, storage device(s) 202). That is, the processor 204, in various embodiments, in configured to execute the instructions included in the workflow module 302, warning module 304, event visualization module 306, equipment detection module 308, equipment identification module 310, equipment operations module 312, action detection module 314, and/or command module 316 stored in the storage device(s) 202.

Figure 4A:
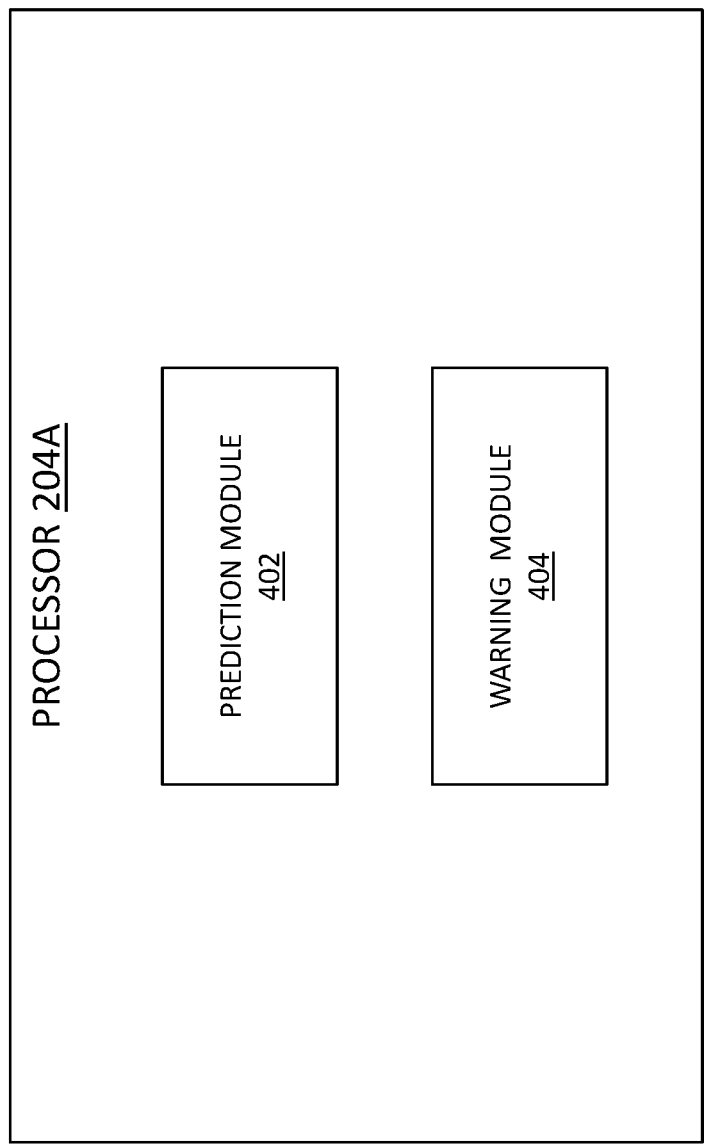
FIG. 4A is a block diagram of a processor included in the administrator of FIG. 2, according to various embodiments.

Referring to FIG. 4A, FIG. 4A is a block diagram of one embodiment of a processor 204A. At least in the illustrated embodiment, the processor 204A includes, among other components, a workflow module 402 and a warning module 404 similar to the various embodiments of the workflow module 302 and the warning module 304 stored in the storage device(s) 202, as discussed elsewhere herein.

Figure 4B:
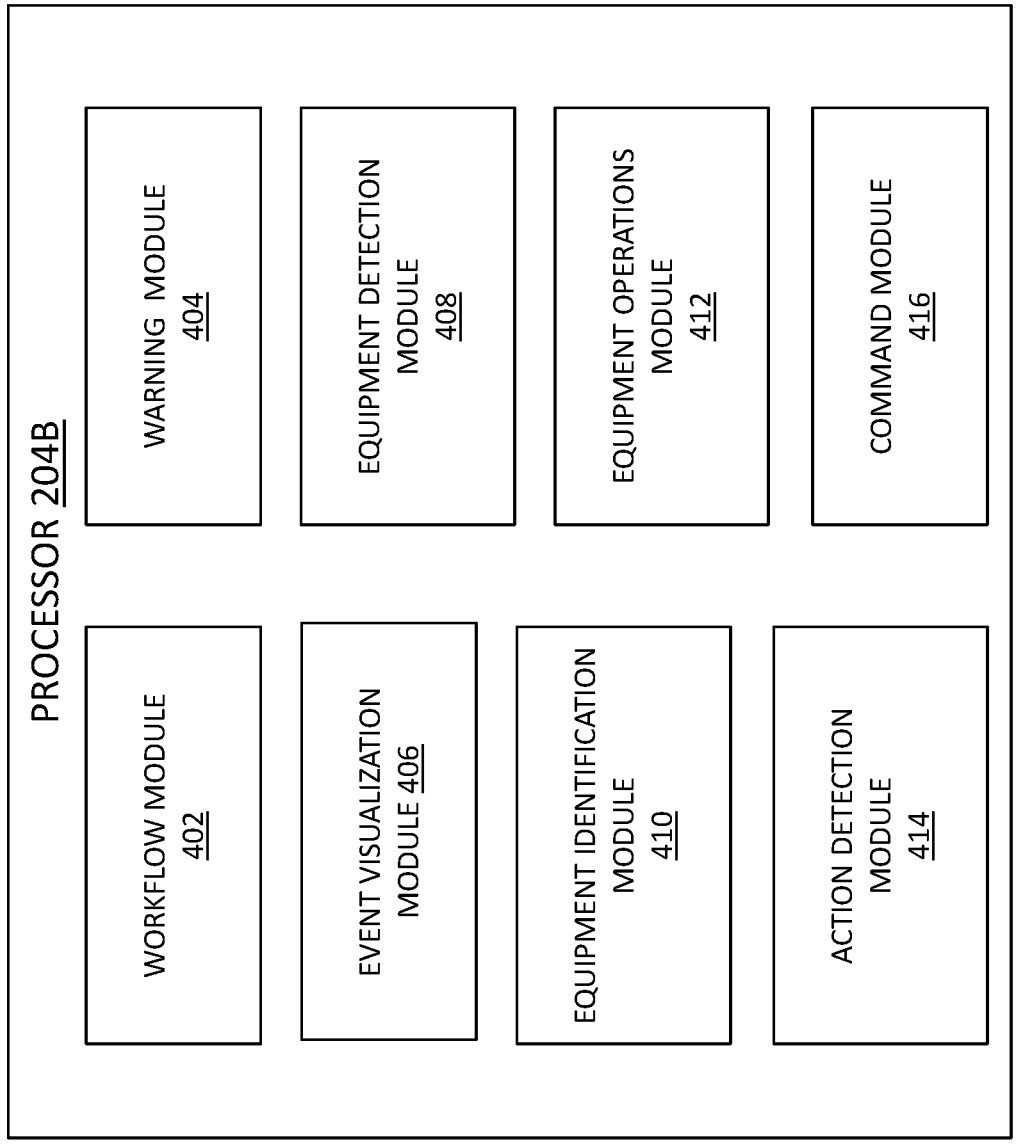
FIG. 4B is a block diagrams of another processor included in the administrator of FIG. 2, according to various embodiments.

With reference to FIG. 4B, FIG. 4B is a block diagram of another embodiment of a processor 204B. At least in the illustrated embodiment, the processor 204B includes, among other components, a workflow module 402, a warning module 404, an event visualization module 406, an equipment detection module 408, an equipment identification module 410, an equipment operations module 412, an action detection module 414, and a command module 416 similar to the workflow module 302, warning module 304, event visualization module 306, equipment detection module 308, equipment identification module 310, equipment operations module 312, action detection module 314, and/or command module 316 stored in the storage device(s) 202, as discussed elsewhere herein.

In some embodiments, the administrator 202 includes the workflow module 302, warning module 304, event visualization module 306, equipment detection module 308, equipment identification module 310, equipment operations module 312, action detection module 314, and/or command module 316 stored in the storage device(s) 202 and the processor 204 is configured to execute the instructions in the workflow module 302, warning module 304, event visualization module 306, equipment detection module 308, equipment identification module 310, equipment operations module 312, action detection module 314, and/or command module 316. In other embodiments, the administrator 202 includes the workflow module 402, warning module 404, event visualization module 406, equipment detection module 408, equipment identification module 410, equipment operations module 412, action detection module 414, and/or command module 416 stored in the processor 204A and/or 204B (also simply referred to individually and/or collectively as, processor(s) 204) and the processor 204 is configured to execute the instructions in the workflow module 402, warning module 404, event visualization module 406, equipment detection module 408, equipment identification module 410, equipment operations module 412, action detection module 414, and/or command module 416 stored in the processor 204.

In still other embodiments, the administrator 202 includes the workflow module 302, warning module 304, event visualization module 306, equipment detection module 308, equipment identification module 310, equipment operations module 312, action detection module 314, and/or command module 316 stored in the storage device(s) 202 and the workflow module 402, warning module 404, event visualization module 406, equipment detection module 408, equipment identification module 410, equipment operations module 412, action detection module 414, and/or command module 416 stored in the processor 204. Here, the processor 204 can execute the instructions in the workflow module 302, warning module 304, event visualization module 306, equipment detection module 308, equipment identification module 310, equipment operations module 312, action detection module 314, command module 316, the workflow module 402, warning module 404, event visualization module 406, equipment detection module 408, equipment identification module 410, equipment operations module 412, action detection module 414, and/or command module 416. That is, the processor 204 can execute the instructions in the various module(s) exclusively from the storage device(s) 202, exclusively from the processor 204, can execute the instructions in one or more of the modules from the storage device(s) 202 and one or more of the modules from the processor 204, and/or can switch back and forth between the storage device(s) 202 and the processor 204.

The various embodiments of system 100, administrator 200, storage device(s) 202, and/or processor 204 can provide systems, apparatus, computer program products and methods in which one or more machines 104 or all of the machines 104 can generate each or all possible events of a workflow process, which can be stored in a centralized server (not shown). While installing one or more machines 104 (e.g., an industrial machine, a residential machine, a military machine, a government machine, a smart machine/device, an IoT machine/device, etc.) in a particular environment (e.g., a smart ecosystem), the administrator 200, processor 204, event visualization module 306, and/or event visualization module 406 can, in various embodiments, use AR glass (and/or any other suitable device discussed herein) to perform a workflow process, integrate one or more relevant events with the new machine(s) 104, and/or integrate the new machine(s) 104 into the workflow process.

To accomplish such, certain embodiments of the administrator 200, processor 204, event visualization module 306, and/or event visualization module 406 is/are configured to utilize AR glass (and/or any other suitable device discussed herein) to visualize the workflow process. That is, the administrator 200, processor 204, event visualization module 306, and/or event visualization module 406 can utilize AR glass to visualize one or more events and/or all of the possible events that are generated by one or more machines 104 and/or all of the machines 104 in a particular environment. Accordingly, the administrator 200, processor 204, event visualization module 306, and/or event visualization module 406 can, in some embodiments, create and/or generate appropriate programs with the generated events to generate/create workflow among the machine(s) 104 in the environment.

In various embodiments, the administrator 200, processor 204, event visualization module 306, and/or event visualization module 406 is/are configured to integrate one or more machine(s) 104 into system 100. The machine(s) 104 can be integrated for any suitable reason and/or purpose (e.g., system upgrade, change in technology, replace a failed machine 104, etc.).

The administrator 200, processor 204, event visualization module 306, and/or event visualization module 406 can integrate any suitable quantity and/or type of machine(s) 104 into system 100. While any type of machine 104 can be integrated into a particular system 100 and/or application of system 100, various embodiments of the administrator 200, processor 204, event visualization module 306, and/or event visualization module 406 can utilize AR glass to visualize what types of events the integrated machine(s) 104 can generate and/or will generate once integrated. Accordingly, some embodiments of the administrator 200, processor 204, event visualization module 306, and/or event visualization module 406 can integrate the event(s) from the machine(s) 104 with one or more operations and/or functionalities of one or more existing machines 104 and/or newly integrated machines 104 in a workflow process.

In some embodiments, the administrator 200, processor 204, event visualization module 306, and/or event visualization module 406 is/are configured to store (e.g., in the storage device(s) 202 and/or in processor 204) historical usage knowledge or historical usage data for one or more of the machines 104 and/or for all of the machines 104. The stored historical usage knowledge can be historical usage knowledge for a specific machine 104 (e.g., machine-specific historical usage knowledge) that forms at least a portion of a machine-specific historical usage knowledge corpus, which can be based on specific information for one or more machines 104 (and/or devices) in system 100. The machine-specific historical usage knowledge corpus is generated/created by the administrator 200, processor 204, event visualization module 306, and/or event visualization module 406 to identify which event(s) is/are relevant to one or more machines 104 or all of the machines 104. Accordingly, various embodiments of the administrator 200, processor 204, event visualization module 306, and/or event visualization module 406 is/are configured to utilize AR glass to visually show a user the relevant event(s) for one or more machines 104 or all of the machines 104.

The administrator 200, processor 204, event visualization module 306, and/or event visualization module 406, in various embodiments, is/are configured to integrate the event(s) generated/created by the machine(s) 104 and the operation(s) performed by a user and visually provide the integration to the user (e.g., integration visualization). While any particular machine 104 can be installed/integrated into any corresponding particular environment (or ecosystem (e.g., smart ecosystem)), the event(s) generated by a newly installed/integrated machine 104 may affect how the user performs user operations/functions in a workflow process of the environment. Accordingly, the administrator 200, processor 204, event visualization module 306, and/or event visualization module 406 can visually provide a modified workflow process that includes the integrated one or more machine events and one or more user operations.

In various embodiments, the administrator 200, processor 204, event visualization module 306, and/or event visualization module 406 is/are configured to contextualize events surrounding the environment within which the system 100 resides. In some embodiments, the surrounding events can be categorized and/or classified based on the type of activity (e.g., political, geopolitical, financial, terrorism, military, etc.) and/or condition (e.g., weather, disease, drought, famine, natural disaster, etc.) and/or the context (e.g., where, when, why, how, etc.) of the type of activity and/or condition. Accordingly, various embodiments of the administrator 200, processor 204, event visualization module 306, and/or event visualization module 406 can utilize AR glass to visually show the user appropriate events based on any selected activity and/or condition for an identified contextual situation so that the user can visualize the relevant event(s).

In various embodiments, the administrator 200, processor 204, event visualization module 306, and/or event visualization module 406 is/are configured to dynamically remove one or more machines 104 and/or one or more operations/functions from a workflow process. In response to a desire to remove a machine 104 from the system 100, which can result in one or more operations of a workflow process changing and/or being removed, and/or in response to a desire to modify/remove one or more operations from a workflow process, the administrator 200, processor 204, event visualization module 306, and/or event visualization module 406 is/are configured to identify which machine(s) 104 will be removed and/or which operation(s) of a workflow process will change and/or be removed. Accordingly, the administrator 200, processor 204, event visualization module 306, and/or event visualization module 406 can utilize AR glass to visually indicate to a user which machine(s) 104 will be removed and/or which operation(s) of a workflow process will change and/or be removed.

Figure 5:
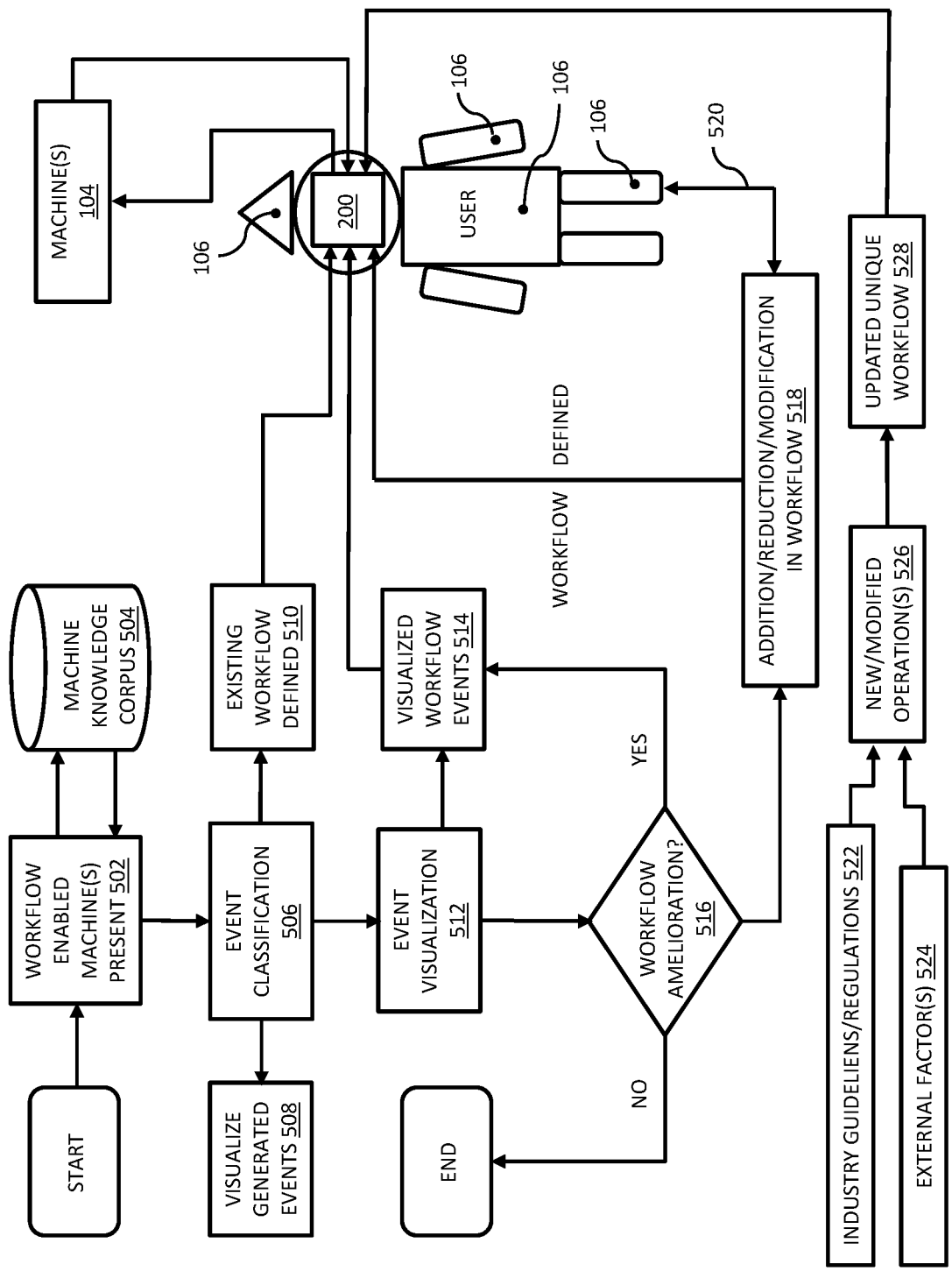
FIG. 5 is a diagram illustrating operations for one embodiment of a workflow process, according to various embodiments.

Referring now to FIG. 5, FIG. 5 is a flow diagram illustrating example workflow operations of one embodiment of a system 100 that can provide intelligent management of asset workflows. The workflow operations begin at the block labeled, "start."

Next, a query is made to determine whether and/or to verify that each of the one or more machines 104 for performing the workflow process are present and/or available (block 502). The determination and/or verification that the machine(s) 104 are present/available can be performed by an equipment detection module 308, 408, as discussed elsewhere herein.

A machine knowledge corpus is queried to determine the machine type for each of the detected machines 104 and/or the type(s) of operations/functions performed by each identified type of detected machine 104 and a response to the query is provided (block 504). The determination of the machine type for each of the detected machine(s) 104 can be performed by an equipment identification module 310, 410, as discussed elsewhere herein.

In addition, the machine knowledge corpus can also be utilized to store and identify one or more previous and/or historical events generated by each machine 104 in determining the types of operations/functions that can be performed by each machine 104 and/or each machine type. That is, because different machines 104 can include different operations/functionalities and such operations/functionalities may be performed at different times/stages of a workflow process, each event generated by each machine 104 is identified and stored in the machine knowledge corpus as a historical event.

A historical event can also be used to determine if/whether the operations/functions and/or operational state (e.g., functioning properly, not functioning properly, etc.) of a machine 104 has changed over time and a machine 104 needing an upgrade and/or replaced can be identified using the stored historical events for a machine 104. The operations/functions capable of be performed by each identified type of detected machine 104 can be determined/identified by an equipment operations module 312, 412, as discussed elsewhere herein.

In some embodiments, the operations described with reference to blocks 502 and 504 can be considered a first stage of a workflow process. Here, the first stage of the workflow process can be considered an event identification and data gathering stage of the workflow process.

A second stage of the workflow process can begin after completion of the first stage. The second stage of the workflow process can be considered an event classification stage (block 506).

During the second stage, an administrator 200 can use, for example, AR glass to visualize the event(s) generated by each of the machines 104 for a user (block 508). Here, the event(s) generated by each of the machines 104 are shown on the AR glass so that the user can interact with the machine(s) 104 to create, follow, and/or define a workflow while integrating one or more machines 104 into the existing workflow process (block 510).

The various events generated by the machine(s) 104 can be classified based on the type of machine 104 that generated the event and/or the context of the activity that resulted in the event, etc., among other classifications that are possible and contemplated herein. Further, based on historical learning, each machine 104 can be identified and/or associated with corresponding events generated by a particular machine 104 and the generated events can be shown to the user on, for example, the AR glass.

In addition, using AR glass, the administrator 200 can select one or more events for integration with one or more other events and/or operations/functionalities of one or more machines 104. Further, while the administrator 200 is present in the environment housing the system 100, the administrator 200 can use AR glass to visualize the machine(s) 104 and/or event(s) generated by each machine 104. These visualization operations can be implemented and/or performed using an event visualization module 306, 406, as discussed elsewhere herein. Moreover, the visualization operations can be considered the end of the second stage of the workflow process (e.g., the event classification stage).

A third stage of the workflow process can begin after completion of the second stage. The third stage of the workflow process can be considered an event visualization stage (block 512). The administrator 200 can use AR glass to connect to a centralized system to obtain one or more event details to project onto the AR glass so that the user can visually detect the detail(s) of one or more events in the system 100.

In various embodiments, the AR glass can allow/enable a user to visually interact with various events generated by the machine(s) 104 and/or various operations/functions of the machine(s) 104 (block 514). While integrating a machine 104 into the system 100, the AR glass can show the user which types of events in the system 100 are being captured.

The administrator 200 can also use the AR glass to visualize for the user various events that are generated by any machine 104 that may be integrated into the system 100. The administrator 200 can further use an AR glass interface included in the AR glass to create a relationship between the AR glass and the event(s) generated by the machine(s) 104, which can further create a correlation between and/or among the various events and the AR glass.

After a correlation is created, the administrator 200 can determine whether a workflow amelioration is needed (block 516). In other words, a determination of whether one or more machine(s) 104 should be added, deleted, and/or modified and/or whether one or more operations/functions in the workflow process should be added, deleted, and/or modified.

In response to determining that one or more machine(s) 104 should not be added, deleted, and/or modified and/or that one or more operations/functions in the workflow process should not be added, deleted, and/or modified (e.g., a "NO" in block 516), the workflow process ends. In response to determining that one or more machine(s) 104 should be added, deleted, and/or modified and/or that one or more operations/functions in the workflow process should be added, deleted, and/or modified (e.g., a "YES" in block 516), the appropriate addition, reduction, and/or modification to the quantity of machines 104 and/or the appropriate addition, reduction, and/or modification to the operations/functions of the workflow can be visually indicated (e.g., via the AR glass) by the administrator 200 (block 518).

In various embodiments, a machine 104 can be integrated into the system 100 and the newly integrated machine 104 can begin performing its respective one or more operations/functions in the proper sequence of a workflow process. The administrator 200 can also identify the contextual need of integrating any machine 104 into the system 100 and can use the AR glass to display to a user any relevant events related to the need for integrating one or more new machines 104. That is, a role of the administrator 200 in system 100 is to manage the integration of new machines 104 into the system 100 by visually identifying, via the AR glass, the needed/desired machine(s) 104 to the user, to visually show the user on the AR glass the relevant event(s) that created the need/desire for integrating the new machine(s) 104, and/or which operation(s) in the workflow process need to be added and/or modified as a result of the machine(s) 104 being integrated/added to the system 100.

In additional or alternative embodiments, a machine 104 can be removed from the system 100 and the respective one or more operations/functions of the removed machine 104 can be removed from the workflow process. The administrator 200 can also identify the contextual need of removing any machine 104 from the system 100 and can use the AR glass to display to a user any relevant events related to the need for removal of one or more machines 104. That is, a role of the administrator 200 in system 100 is to manage the removal of machines 104 from the system 100 by visually identifying, via the AR glass, the machine(s) 104 that need(s) to be removed to the user, to visually show the user on the AR glass the relevant event(s) that created the need/desire to remove the machine(s) 104, and/or which operation(s) in the workflow process need to be removed and/or modified as a result of the machine(s) 104 being removed.

In various embodiments, the sensor(s) 106 worn by the user can be utilized to verify and/or confirm to the administrator 200 that the appropriate addition, reduction, and/or modification to the quantity of machines 104 and/or the appropriate addition, reduction, and/or modification to the operations/functions of the workflow have been made and/or implemented (communications 520). Further, the administrator 200 can visually notify the user that the change(s) has/been made using the AR glass.

The administrator 200 completing the operations in the third stage can result in the workflow process being defined. However, various embodiments can further include other factors and/or considerations that can influence a workflow process.

At least one example factor and/or consideration that can influence a workflow process includes industry guidelines and/or regulations and/or a change in industry guidelines and/or regulations (block 522). Here, industry-specific guidelines and/or regulations related to, for example, safety should be integrated into a workflow process to ensure that the proper protocols and/or laws are followed.

Another example factor and/or consideration that can influence a workflow process includes one or more external factors and/or conditions (block 524). Examples of an external factor can include, but are not limited to, political, geopolitical, financial events, terrorism, military events, and/or one or more external conditions (e.g., weather, disease, drought, famine, natural disaster, etc.).

In response to the factor(s)/consideration(s), the workflow process can include one or more new or modified operations (block 526). The new or modified operations in the workflow process can define a new and/or modified embodiment of the workflow process. Further, a new and/or modified embodiment of the workflow process can define an updated and/or unique workflow process (block 528), which the administrator 200 can visually display to the user on AR glass.

Figure 6:
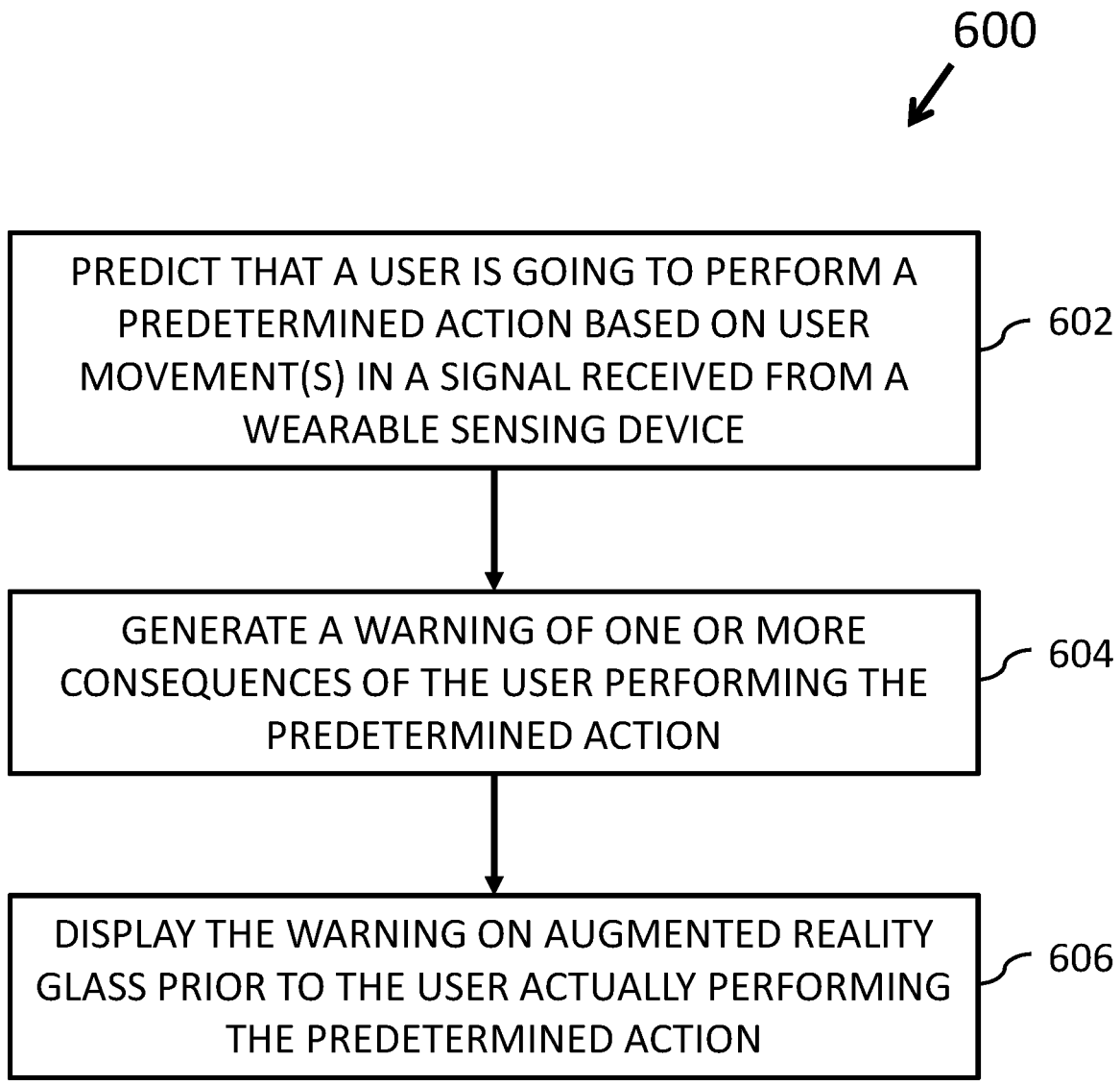
FIG. 6 is a schematic flow chart diagram illustrating a method for intelligent management of asset workflows, according to various embodiments.

Referring to FIG. 6, FIG. 6 is a schematic flow chart diagram illustrating one embodiment of a method 600 for providing intelligent management of asset workflows. At least in the illustrated embodiment, the method 600 can begin by a processor 204 predicting that a user is going to and/or is about to perform a predetermined action based on one or more user movements included in a signal received from a wearable sensing device (block 602).

The processor 204 can generate a warning of one or more consequences of the user performing the predetermined action (block 604). The consequence(s) may include any of the consequences discussed elsewhere herein. The processor can then display the warning to the user on AR glass (block 606).

Figure 7:
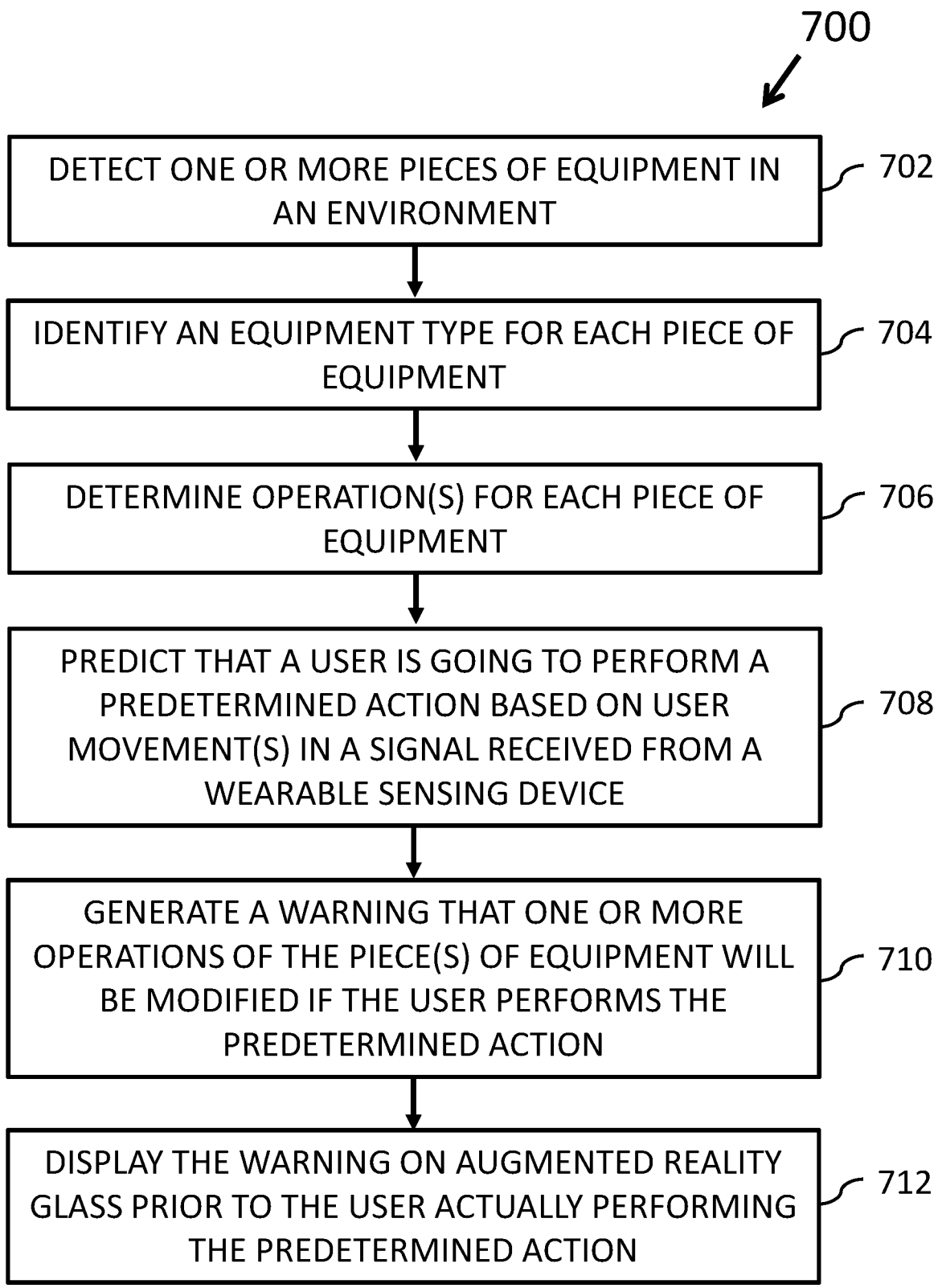
FIG. 7 is a schematic flow chart diagram illustrating another method for intelligent management of asset workflows, according to various embodiments.

With reference to FIG. 7, FIG. 7 is a schematic flow chart diagram illustrating another embodiment of a method 700 for providing intelligent management of asset workflows. At least in the illustrated embodiment, the method 700 can begin by a processor 204 detecting one or more pieces of equipment (e.g., machine(s) 104) in an environment (block 702). Each piece of equipment can be detected using any the technologies and/or techniques discussed elsewhere herein.

The processor 204 can identify the equipment type for each piece of equipment (block 704). Each piece of equipment can be identified using any the technologies and/or techniques discussed elsewhere herein.

In addition, the processor 204 can determine the operations for each identified and detected piece of equipment (block 706). The operations for piece of equipment can be determined using any the technologies and/or techniques discussed elsewhere herein.

Further, the processor can predict that a user is going to and/or is about to perform a predetermined action based on one or more user movements included in a signal received from a wearable sensing device (block 708) and generate a warning of one or more consequences of the user performing the predetermined action (block 710). The consequence(s) may include any of the consequences discussed elsewhere herein. The processor can then display the warning to the user on AR glass (block 712).

Figure 8:
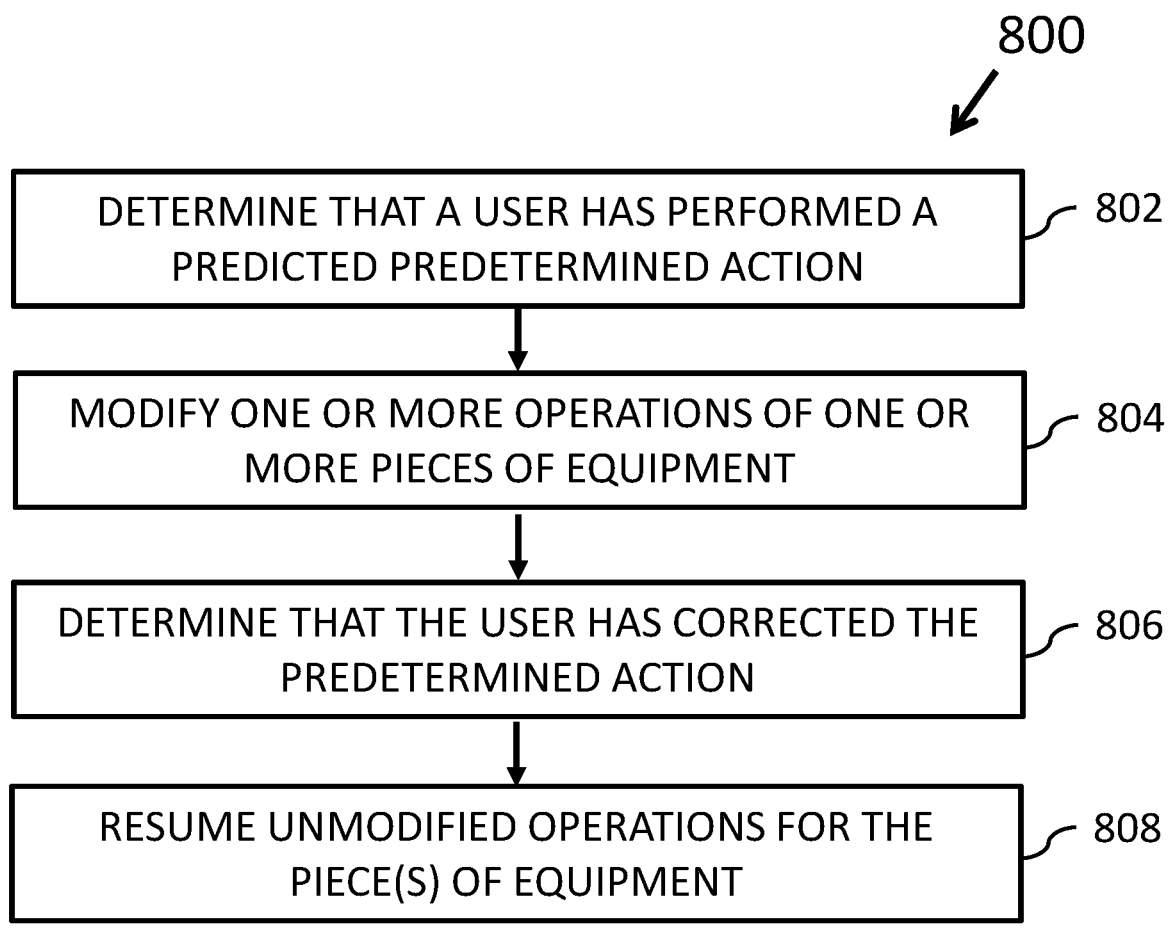
FIG. 8 is a schematic flow chart diagram illustrating yet another method for intelligent management of asset workflows, according to various embodiments.

Referring to FIG. 8, FIG. 8 is a schematic flow chart diagram illustrating another embodiment of a method 800 for providing intelligent management of asset workflows. The method 800 can be an independent method and/or can be implemented as an addition to method 600 and/or method 700.

At least in the illustrated embodiment, the method 800 can begin by a processor 204 determining that a user has performed a predicted predetermined action (block 802). The predetermined action can be any the predetermined actions discussed elsewhere herein.

The processor 204 can modify one or more operations of one or more pieces of equipment (e.g., machine(s) 104) in response to determining that the user has performed the predetermined action (block 804). The piece(s) of equipment can be modified in accordance with any of the modifications discussed elsewhere herein.

In various embodiments, the processor 204 can determine that the user has corrected the predetermined action (block 806) and can resume unmodified operations of the piece(s) of equipment (block 808). The corrections to the predetermined action can include, for example, the user putting back on removed article(s) of clothing, article(s) of safety clothing, accessory/accessories, safety accessory/accessories, equipment, and/or safety equipment, etc., and/or retreating from a particular (different) geographic location, among other suitable corrections that are possible, as discussed elsewhere herein.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system comprising:
   a wearable piece of equipment including a first wearable computing device configured to detect one or more user movements; and
   a second wearable computing device is an augmented reality glass configured to:
      identify a new machine for integration into an environment with one or more pieces of equipment within which the augmented reality glass resides;
      integrating a plurality of operations associated with the new machine into a workflow process for the environment;
      predict that a user of the wearable piece of equipment is going to perform a predetermined action based on the one or more user movements, wherein the predetermined action is a first operation from the plurality of operations associated with the workflow process for the new machine; and
      modify, based on the predetermined action, the first operation from the plurality of operations of the new machine in the environment, wherein modifying the first operation includes transmitting a signal to the new machine to perform a slowing operation for a predetermined amount of time.

2. The system of claim 1, wherein:
   the augmented reality glass is further configured to warn the user of one or more consequences of removing the wearable piece of equipment.

3. The system of claim 2, wherein the augmented reality glass is further configured to:
   detect the one or more pieces of equipment in the environment within which the augmented reality glass resides; and
   identify a type of equipment for each piece of equipment of the one or more pieces of equipment in the environment within which the augmented reality glass resides.

4. The system of claim 3, wherein modifying the first operation from the plurality of operations of the new machine further comprises at least one of:
   stopping operations of the new machine; or
   pausing operations of the new machine.

5. The system of claim 4, wherein the augmented reality glass is further configured to:
   determine that the user has removed the wearable piece of equipment based on one or more other user movements.

6. The system of claim 2, wherein modifying the first operation from the plurality of operations of the new machine further comprises at least one of:
   stopping operations of the new machine; or
   pausing operations of the new machine.

7. The system of claim 6, wherein the augmented reality glass is further configured to:
   determine that the user has removed the wearable piece of equipment based on one or more other user movements.

8. The system of claim 1, wherein the augmented reality glass is further configured to:
   predict that the user is going to move to a particular geographic location; and
   warn the user of one or more consequences of moving to the particular geographic location.

9. The system of claim 8, wherein the augmented reality glass is further configured to:
   modify a second operation from the plurality of operations of the new machine.

10. The system of claim 9, wherein the second operation comprises one of:
    stopping operations of the new machine; and
    pausing operations of the new machine.

11. A method, comprising:
    identifying a new machine for integration into an environment with one or more pieces of equipment within which an augmented reality glass resides;
    integrating a plurality of operations associated with the new machine into a workflow process for the environment;
    predicting, via the augmented reality glass, that a user is going to perform a predetermined action based on one or more user movements included in a signal received from a wearable sensing device, wherein the predetermined action is a first operation from the plurality of operations associated with the workflow process for the new machine; and
    modifying, based on the predetermined action, the first operation from the plurality of operations of the new machine in the environment, wherein modifying the first operation includes transmitting a signal to the new machine to perform a slowing operation for a predetermined amount of time.

12. The method of claim 11, further comprising:
    warning, via the augmented reality glass, the user of one or more consequences of removing the wearable sensing device.

13. The method of claim 12, further comprising:
detecting the one or more pieces of equipment in the environment within which the augmented reality glass resides; and
identify a type of equipment for each piece of equipment of the one or more pieces of equipment in the environment within which the augmented reality glass resides.

14. The method of claim 13, wherein modifying the first operation from the plurality of operations of the new machine further comprises at least one of:
stopping operations of the new machine; or
pausing operation of the new machine.

15. The method of claim 14, further comprising:
determining, via the augmented reality glass, that the user has removed the wearable sensing device based on one or more other user movements.

16. The method of claim 12, wherein modifying the first operation from the plurality of operations of the new machine further comprises at least one of:
stopping operations of the new machine; or
pausing operation of at the new machine.

17. The method of claim 16, further comprising:
determining, via the augmented reality glass, that the user has removed the wearable sensing device based on one or more other user movements.

18. The method of claim 11, further comprising:
predicting, via the augmented reality glass, that the user is going to move to a particular geographic location; and
warning, via the augmented reality glass, the user of one or more consequences of moving to the particular geographic location.

19. The method of claim 18, further comprising:
modifying, via the augmented reality glass, a second operation of the new machine in the environment.

20. The method of claim 19, wherein the second operation comprises one of:
stopping operations of the new machine; and
pausing operations of the new machine.

* * * * *